United States Patent
Park et al.

(10) Patent No.: US 9,109,675 B2
(45) Date of Patent: Aug. 18, 2015

(54) HYBRID POWER TRAIN FOR VEHICLE

(71) Applicant: Hyundai Motor Company, Seoul (KR)

(72) Inventors: Jong Yun Park, Hwaseong-si (KR); Jae Young Choi, Busan (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/455,466

(22) Filed: Aug. 8, 2014

(65) Prior Publication Data

US 2015/0119177 A1  Apr. 30, 2015

(30) Foreign Application Priority Data

Oct. 29, 2013  (KR) .......................... 10-2013-0129291

(51) Int. Cl.
*F16H 3/72* (2006.01)
*F16H 3/78* (2006.01)
*F16H 3/44* (2006.01)

(52) U.S. Cl.
CPC ................ *F16H 3/725* (2013.01); *F16H 3/721* (2013.01); *F16H 3/78* (2013.01); *F16H 2003/445* (2013.01); *F16H 2200/0052* (2013.01); *F16H 2200/2005* (2013.01); *F16H 2702/02* (2013.01); *Y10S 903/909* (2013.01)

(58) Field of Classification Search
None
See application file for complete search history.

(56) References Cited

U.S. PATENT DOCUMENTS

| | | | | |
|---|---|---|---|---|
| 5,603,242 A * | 2/1997 | Krieger | .......................... | 74/335 |
| 7,462,121 B2 * | 12/2008 | Janson et al. | ..................... | 475/5 |
| 7,575,529 B2 * | 8/2009 | Holmes | ............................ | 475/5 |
| 8,517,876 B2 * | 8/2013 | Sakai et al. | ....................... | 475/5 |
| 8,806,975 B2 * | 8/2014 | Schneider et al. | ............ | 74/473.1 |

FOREIGN PATENT DOCUMENTS

| JP | 2005-054938 A | 3/2005 |
|---|---|---|
| JP | 2008-240929 A | 10/2008 |
| JP | 2011-16428 A | 1/2011 |
| JP | 2012-086596 A | 5/2012 |
| KR | 1020120019855 A | 3/2012 |

* cited by examiner

*Primary Examiner* — Dirk Wright
(74) *Attorney, Agent, or Firm* — Morgan, Lewis & Bockius LLP (57) ABSTRACT

A hybrid power train for a vehicle may include a gear module having a plurality of shift stages of a synchromesh type on a first input shaft and an output shaft arranged in parallel, a second input shaft driven by a motor and disposed coaxially with the first input shaft, a clutch means for connecting or disconnecting the second input shaft and the first input shaft, and variable shift ratio providing means for transmitting the torque of the second input shaft to the output shaft through an external engaged-gear pair selectively in two different shift ratios.

7 Claims, 8 Drawing Sheets

HYBRID POWER TRAIN FOR VEHICLE

CROSS-REFERENCE(S) TO RELATED APPLICATION

The present application claims priority of Korean Patent Application Number 10-2013-0129291 filed on Oct. 29, 2013, the entire contents of which application are incorporated herein for all purposes by this reference.

BACKGROUND OF INVENTION

1. Field of Invention

The present invention relates to a hybrid power train for a vehicle, and more particularly, to a hybrid power train structure based on a mechanism of a synchromesh type manual transmission.

2. Description of Related Art

Generally, a hybrid power train configured to drive a vehicle by appropriately coordinating the power generated by an internal combustion engine and the power generated by an electrically-driven motor improves the efficiency of vehicle operation by utilizing complementary aspects of the torque property that an engine basically exhibits and the torque property of a motor.

Accordingly, a conventional hybrid power train may implement all of an EV mode at which the characteristics of the motor which exhibits an excellent torque property at low speeds is utilized by driving the vehicle mainly with the motor at start-off or low speed of the vehicle, an engine mode at which the vehicle can be driven with the engine which exhibits a relatively excellent torque property at mid-to high speeds, and a hybrid mode at which the torque from both the engine and the motor can be utilized when high torque is desired.

A hybrid power train based on a conventional manual transmission is constructed as an AMT (automated manual transmission) so as to control both the motor and the AMT together. In consideration of the size of a transmission and the ultimate fuel efficiency of the vehicle, the hybrid power train is designed such that the power from the motor covers the drive torque of the vehicle at low speeds by employing mainly reduction gears and the engine power is responsible for the drive torque of the vehicle at high speeds mainly through speed-increasing gears. Therefore, it is difficult to ensure a smooth shift feeling in case of a wide interval between shift stages and there exists a drawback of overall poor shift feeling due to torque interruptions at gear changes that an AMT exhibits inherently.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention is designed to solve such problems as described above and/or other problems, and to provide a hybrid power train for a vehicle, which can be configured compactly by forming effective shift ratios having a series of appropriate shift ratio intervals through the variable shift ratio providing means for transmitting the power of the motor, together with the gear module and further a degree of freedom for forming smaller shift ratio intervals over an entire range of the shift stage, which can be implemented, is ensured. Additionally, according to the hybrid power train for a vehicle of the present invention, torque interruptions are prevented when shifting gears, thereby providing an excellent shift quality and improving fuel efficiency of a vehicle.

A hybrid power train for a vehicle in accordance with the present invention may include a gear module having a plurality of shift stages in a synchromesh type on a first input shaft and an output shaft arranged in parallel, a second input shaft driven by a motor and disposed coaxially with the first input shaft, a clutch means for connecting or disconnecting the second input shaft and the first input shaft, and variable shift ratio providing means for transmitting the torque of the second input shaft to the output shaft through an external engaged-gear pair selectively in two different shift ratios.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
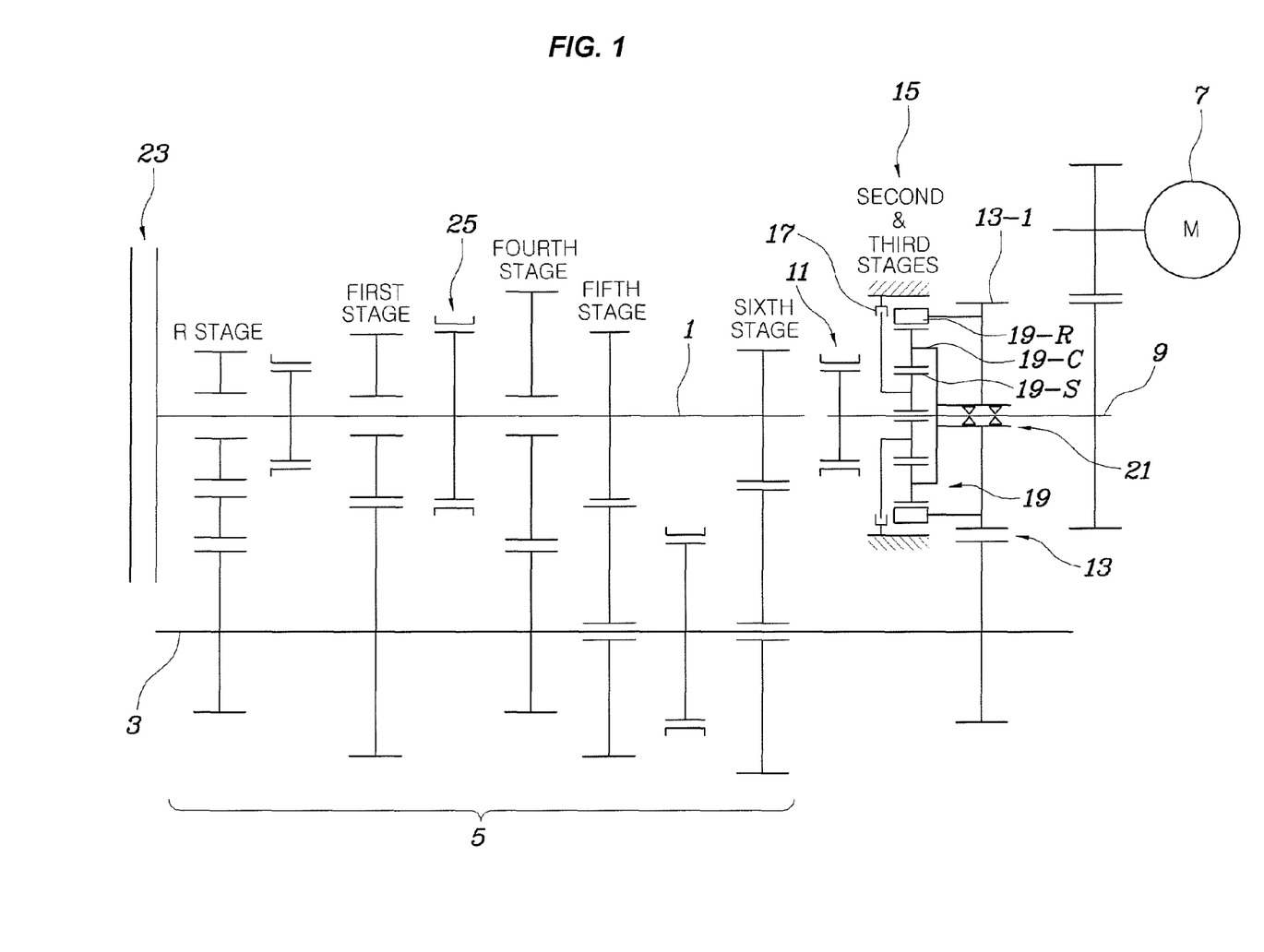
FIG. 1 is a diagram illustrating an exemplary hybrid power train for a vehicle in accordance with the present invention.

With reference to FIG. 1, a hybrid power train for a vehicle according to various embodiments of the present invention includes a gear module 5 having a plurality of shift stages to be synchro-meshed on a first input shaft 1 and an output shaft 3 which are parallel to each other, a second input shaft 9 driven by a motor 7 and arranged coaxially with the first input shaft 1, clutch means 11 for connecting or disconnecting the second input shaft 9 and the first input shaft 1, and variable shift ratio providing means 15 for transmitting the torque of the second input shaft 9 to the output shaft 3 through an external engaged-gear pair 13 selectively in two different shift ratios.

The variable shift ratio providing means 15 is configured to establish a series of shift ratios having effective intervals together with the shift stages implemented by the gear module 5. In other words, it is possible to implement a series of effective and appropriate shift ratios necessary for a vehicle, by means of the gear module 5 consisting of a conventional manual transmission mechanism of a synchromesh type, the external engaged-gear pair 13 arranged on the second input shaft 9 and the output shaft 3, and the variable shift ratio providing means 15.

For example, the gear module 5 is provided with the shift stages having shift ratios of at least forward first and fourth stages and the variable shift ratio providing means 15 provides shift ratios of a second and third stages. Accordingly, the power train is configured to implement a series of effective shift ratios having appropriate intervals for the first to fourth stages and further up to a sixth stage can be implemented in various embodiments of the present invention.

Here, the effective shift ratios having appropriate intervals means that the relationship between the two shift ratios provided by the variable shift ratio providing means 15 and the gear ratios of the shift stages provided in the gear module 5 does not cause too large intervals or too small intervals between the shift stages, thereby forming intervals of an appropriate level between the shift stages so as to be substantially effective shift ratios.

That is, in comparison of the gear module 5 with a conventional common manual transmission, the second and third shift stages that have to be implemented by the gear module 5 are now provided by the variable shift ratio providing means 15. Accordingly, by making it possible to implement a series of shift ratios having appropriate and effective intervals between the shift stages, an excellent shift feeling can be ensured.

The clutch means 11 consists of a synchronizer having a hub installed on the second input shaft 9, so that on the one hand, the sleeve of the synchronizer is slid linearly toward the first input shaft 1, thereby coupling integrally the first input shaft 1 and the second input shaft 9 to be rotated together and on the other hand, the sleeve is slid toward the second input shaft 9, thereby decoupling the first input shaft 1 and the second input shaft 9. The variable shift ratio providing means 15 includes a planetary gear unit 19 of which a first one of three rotary elements is directly connected to the second input shaft 9, a second one is directly connected to an external engaged-gear 13-1 of the external engaged-gear pair 13, and the last one is directly connected to a brake 17 capable of restricting the rotation thereof.

The external engaged-gear to which the planetary gear unit 19 is connected is installed coaxially on the second input shaft 9 and a one-way clutch 21 is provided between the external engaged-gear and the second input shaft 9 for delivering power in one direction only from the second input shaft 9 to the external engaged-gear.

More specifically, in some embodiments, the planetary gear unit 19 includes a plurality of rotary elements such as the three rotary elements of a sun gear 19-S, a carrier 19-C, and a ring gear 19-R wherein the carrier 19-C is directly connected to the second input shaft 9, the ring gear 19-R is directly connected to the external gear 13-1, and the sun gear 19-S is connected to the brake 17.

Furthermore, the first input shaft 1 of the gear module 5 is connected to an engine through an engine clutch 23.

Figure 2A:
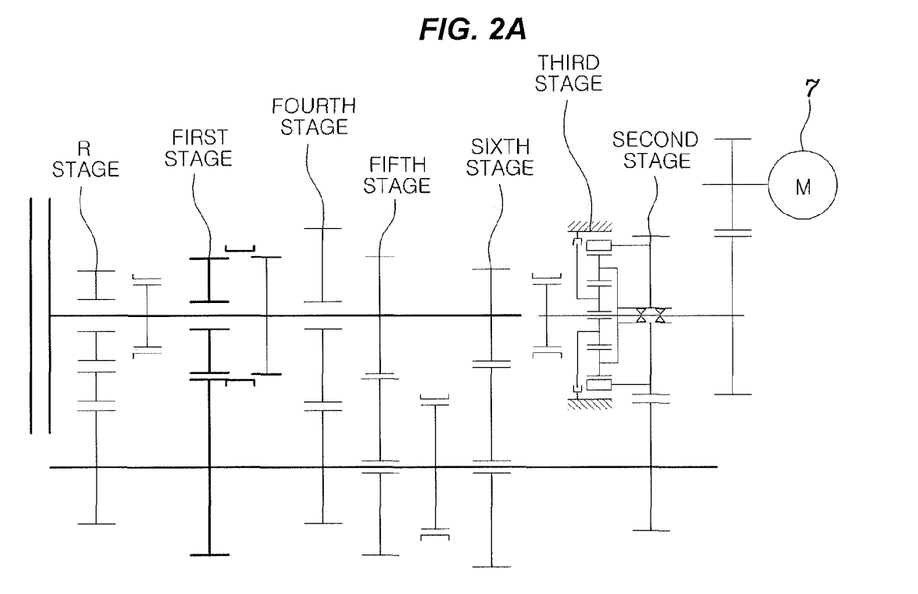
FIGS. 2A-2E illustrate processes of changing from a first stage to a second stage in an exemplary hybrid power train of FIG. 1.

FIGS. 2A-2E illustrate processes of shifting a first stage to a second stage in the embodiment of the present invention as constructed above wherein the state illustrated in FIG. 2A represents that the power provided from the engine through the engine clutch 23 is transmitted to the output shaft 3 by way of the first stage of the gear module 5. The sleeve of the synchronizer of the first & fourth stages is coupled to the first gear so that the power provided to the first input shaft 1 through the engine clutch 23 from the engine is transmitted to the shift gear of the first stage by way of the synchronizer 25 of the first & fourth stages and to the output shaft 3. At this time, the clutch means 11 for coupling and decoupling between the first input shaft 1 and the second input shaft 9 is disengaged and the motor 7 remains stationary so that the second input shaft 9 does not rotate.

Figure 2B:
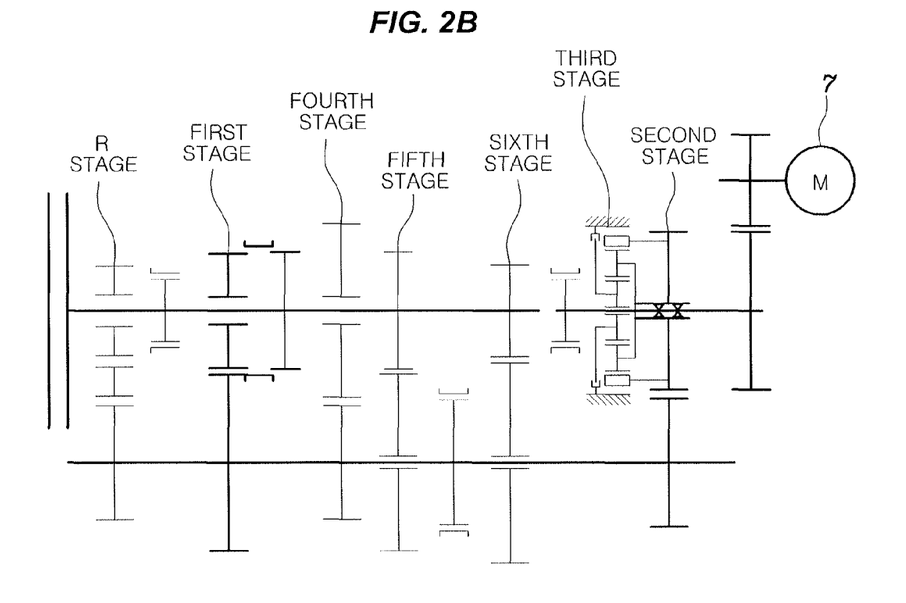

The state illustrated in FIG. 2B represents that the motor 7 is driven from the state illustrated in FIG. 2A so that the torque of the second input shaft 9 is transmitted to the output shaft 3 through the one-way clutch 21 and the external engaged-gear. At this time, the brake 17 is released so that the sun gear 19-S is rotated freely and the carrier 19-C is rotated independently of the ring gear 19-R, and the speed of the motor 7 is controlled to match the rotation speed of the output shaft 3 driven by the engine.

Figure 2C:
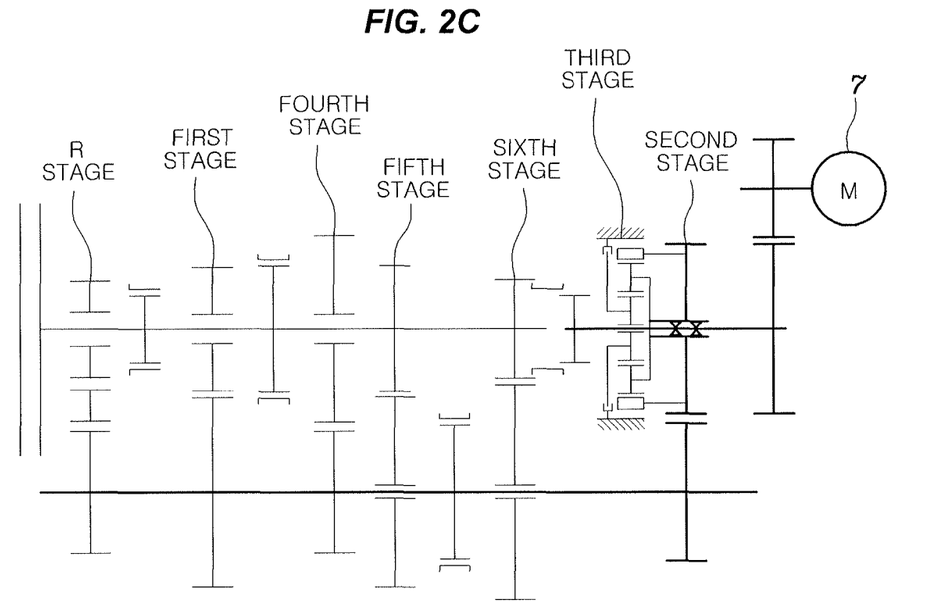

Thereafter, when the engine clutch 23 is disengaged and the synchronizer of the first & fourth stages is released as shown in the state illustrated in FIG. 2C, the output shaft 3 maintains the speed of the first stage not by the power from the engine but by the power from the motor 7.

Thus, while a torque drop would occur due to the interruption of power transmission to the output shaft 3 when the engine clutch 23 is released as above in the case of a conventional common AMT, torque is provided continuously to the output shaft 3 from the motor 7 even at the situation where the engine clutch is released, thereby ensuring a smooth shift feeling.

In addition, the first input shaft 1 and the second input shaft 9 are connected through the clutch means 11 to be rotated integrally in the state illustrated in FIG. 2C.

Figure 2D:
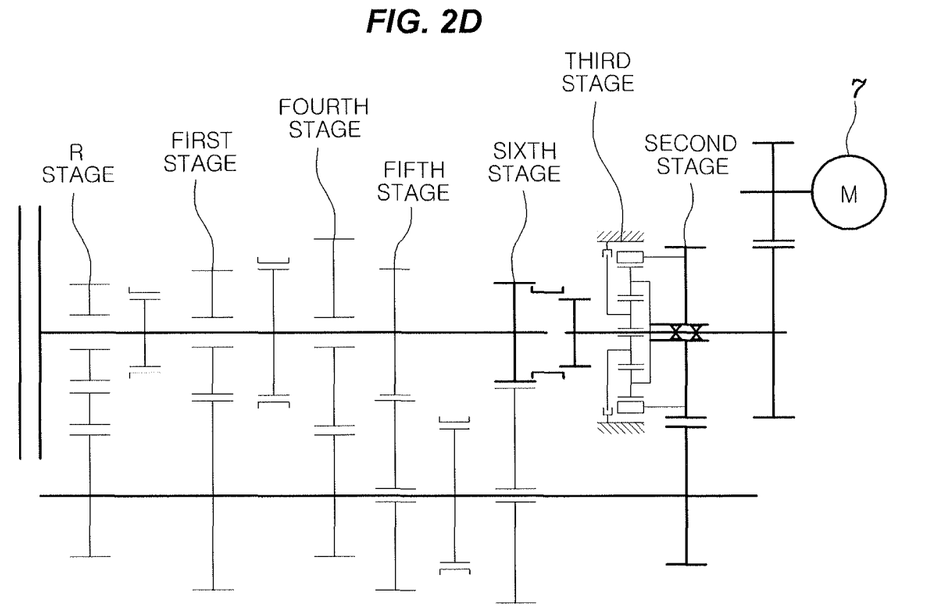
Figure 2E:
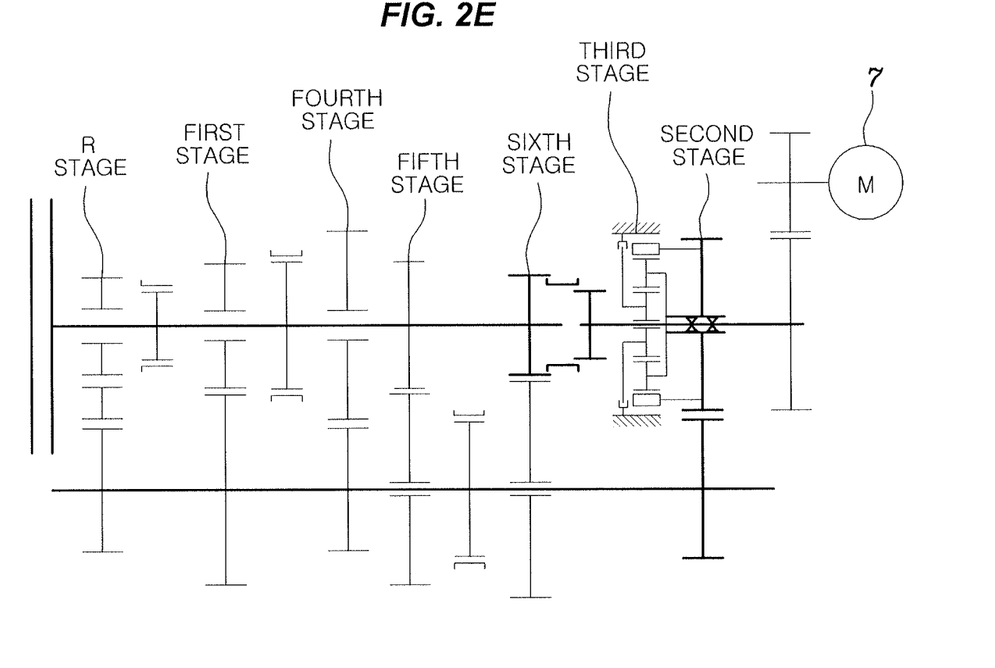

From the state as described above, when the engine clutch 23 is engaged as shown in the state illustrated in FIG. 2D, the external engaged-gear pair 13 establishes the second shift stage with the torque provided by the engine and the motor 7 so to drive the output shaft 3. Thereafter, when the motor 7 stops as in the state illustrated in 2E, the second shift stage is established by the engine only.

Figure 3A:
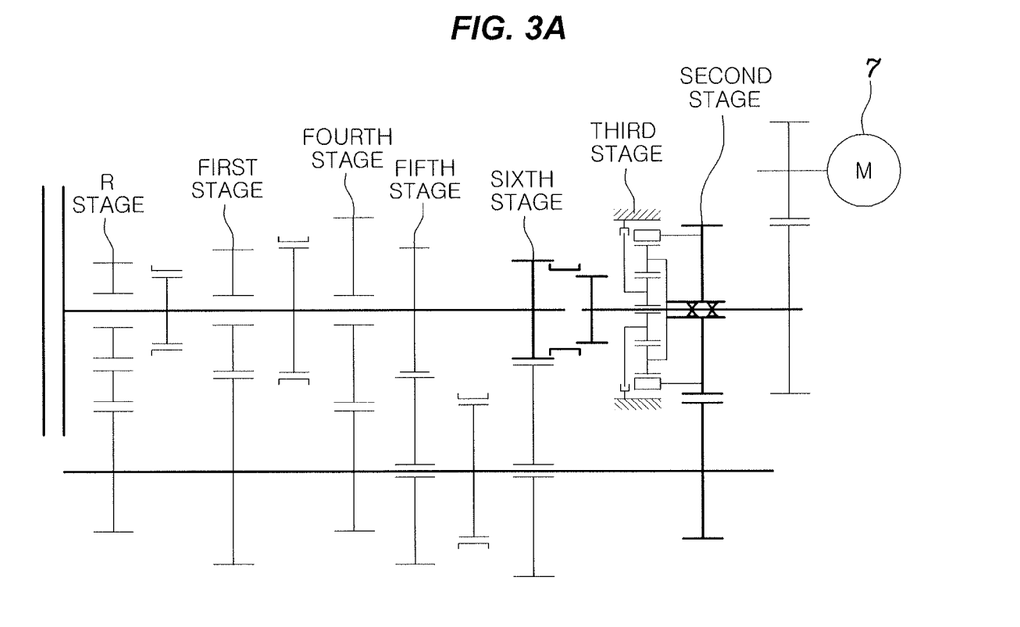
FIGS. 3A-3B illustrate processes of changing from a second stage to a third stage in an exemplary hybrid power train of FIG. 1.
Figure 3B:
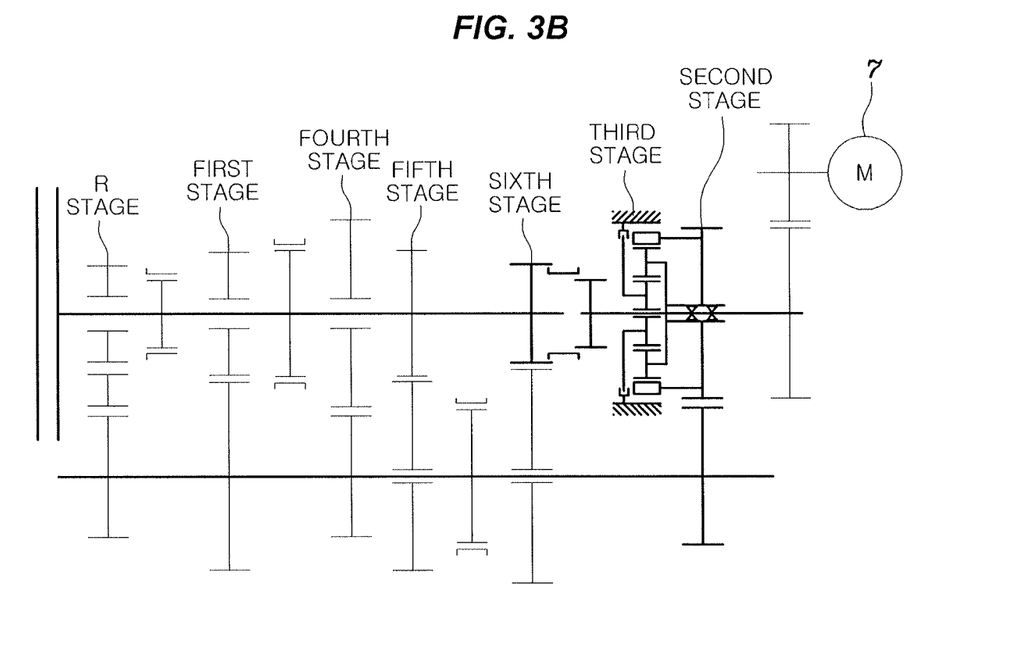

In other words, torque is provided continuously to the output shaft 3 from the motor 7 even in a situation where the power from the engine cannot be transmitted to the output shaft 3 after the engine clutch 23 is disengaged during a shifting from the first stage to the second stage, so as to prevent torque interruption, thereby improving a shift feeling. By making it possible to implement the second stage with the engine only, with the motor 7 only, or with both the engine and the motor 7, fuel efficiency can be improved through the implement of the second stage with an appropriate combination of power sources according to the operating state of a vehicle. FIGS. 3A-3B illustrate processes of shifting a second stage to a third stage and the state illustrated in FIG. 3A is the same as the state illustrated in FIG. 2E wherein a vehicle is driven at a second stage by the engine only. The power from the engine is transmitted to the external engaged-gear pair 13 through the first input shaft 1, the clutch means 11, the second input shaft 9, and the one-way clutch 21 so as to implement the second stage. Here, the brake 17 is released and thus the second input shaft 9 and the carrier 19-C are rotated independent of the rotation of the ring gear 19-R and the external engaged-gear.

When the brake 17 is applied to secure the sun gear 19-S from the state described above, the torque of the carrier 19-C connected integrally to the second input shaft 9 increases to be transmitted to the external engaged-gear pair 13 through the ring gear 19-R, thereby establishing a shift ratio of a third stage.

In other words, the shifting to the third stage from the second stage is completed by only the application of the brake 17 wherein no torque drop occurs during the shifting.

Figure 4A:
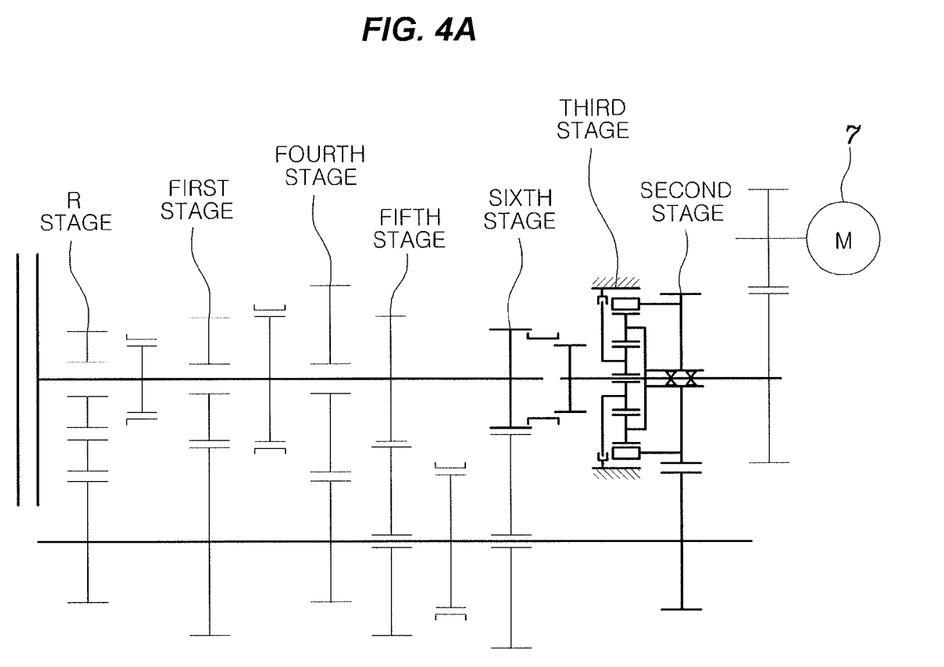
FIGS. 4A-4E illustrate processes of changing from a third stage to a fourth stage in an exemplary hybrid power train of FIG. 1.
Figure 4B:
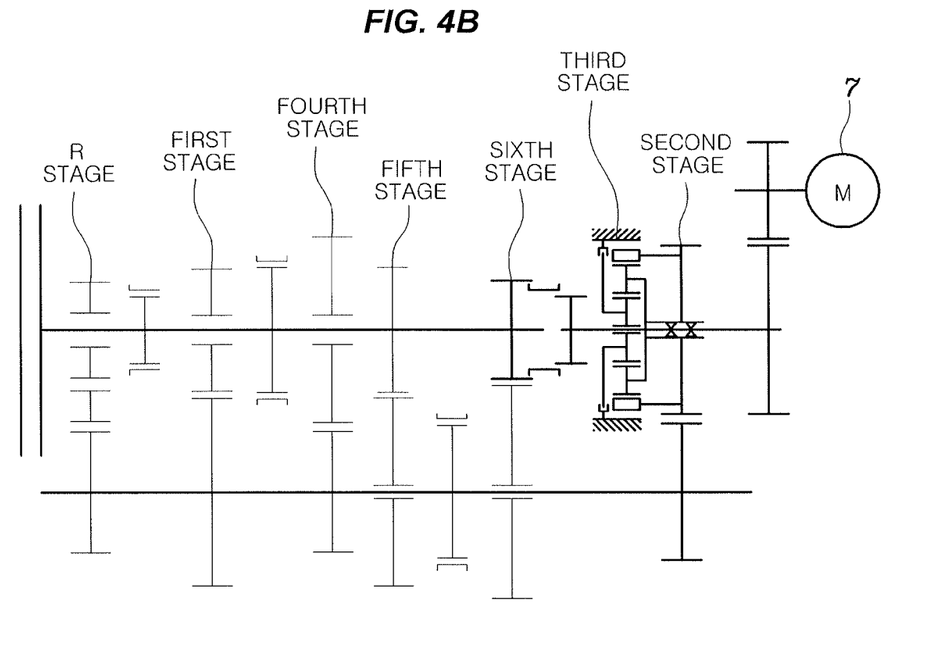

FIGS. 4A-4E illustrate processes of shifting to a fourth stage from a third stage wherein the state in FIG. 4A is the same as the state illustrated in FIG. 3B. From this state, the motor 7 is controlled to correspond to the current speed of the output shaft 3 as shown in the state illustrated in FIG. 4B, so as to change into a state where the output shaft 3 is driven by both the motor 7 and the engine at the same time.

Figure 4C:
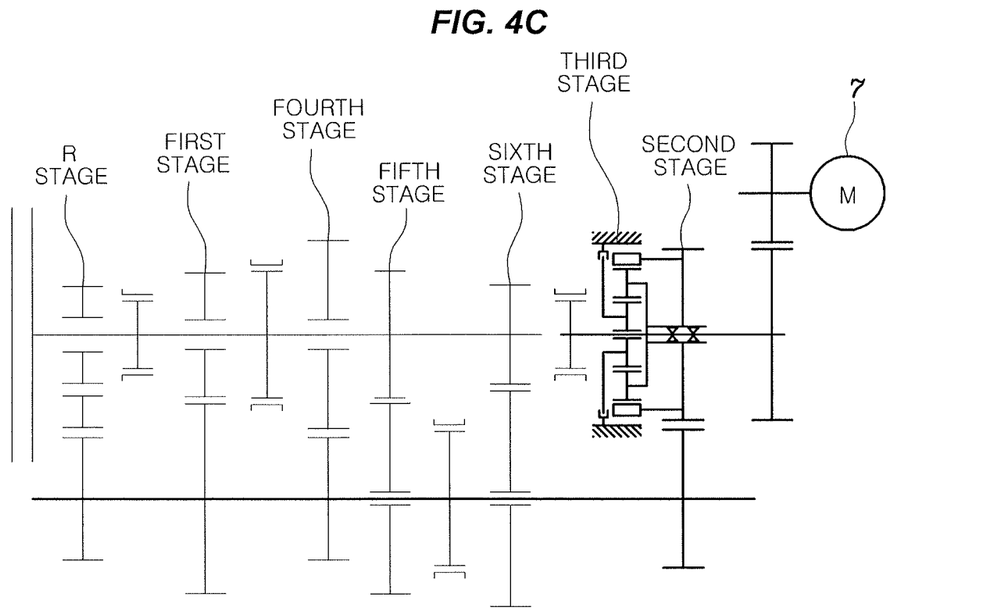

Subsequently, the engine clutch 23 is disengaged and the clutch means 11 is released as well, so that the output shaft 3 maintains a drive state of the third stage by the motor 7 and the first input shaft 1 rotates freely.

Figure 4D:
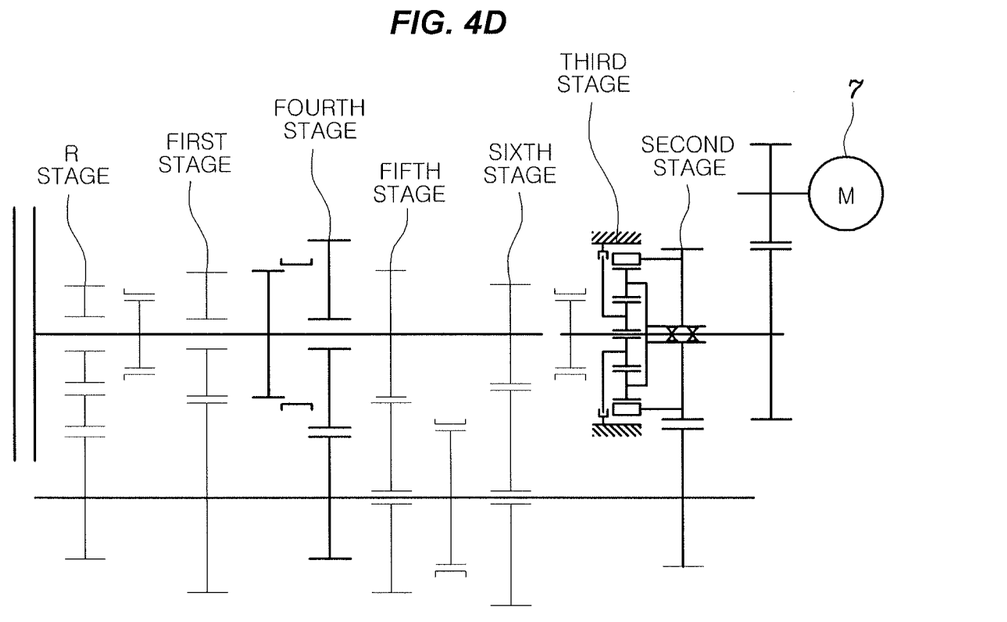

The synchronizer of the first & fourth stages is used to connect the shift gear of the fourth stage to the first input shaft 1 at the state described above and the engine clutch 23 is engaged to shift to the fourth stage as shown in the state illustrated in FIG. 4D. At this time, the motor 7 can be controlled appropriately to follow the change of the rotation speed of the output shaft 3 and there will be no problem even in a case where the rotation speed of the motor 7 is relatively low because the speed difference is resolved by the one-way clutch 21.

Figure 4E:
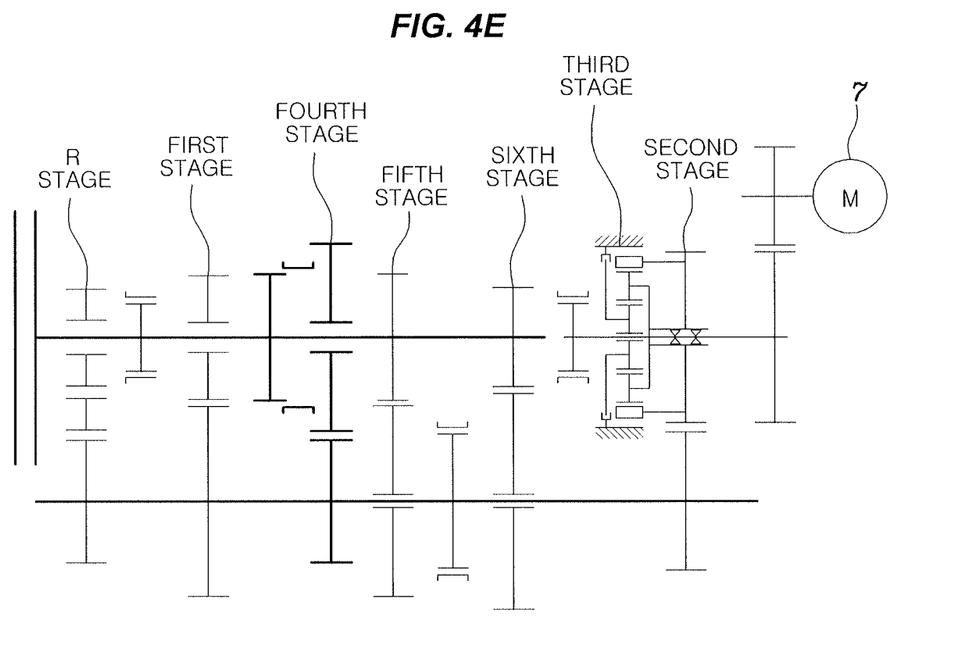

Next, when the motor 7 stops as shown in the state illustrated FIG. 4E, the shift to the fourth stage where a vehicle is driven only by the engine is completed.

It is also possible to control to provide torque continuously to the output shaft 3 by means of the motor 7 during the shifting in substantially the same way as described above even in a shifting of the fourth to sixth stages later, and it is preferable to control the rpm of the motor 7 at a relatively low speed by applying the brake 17 in this case, if possible.

As described above, the hybrid power train for a vehicle according to the present invention can be configured compactly by forming effective shift ratios having a series of appropriate intervals through the variable shift ratio providing means 15 for transmitting the power of the motor 7, together with the gear module 5 and further a degree of freedom for forming smaller shift ratio intervals over an entire range of the shift stage, which can be implemented, is ensured. Additionally, according to the hybrid power train for a vehicle of the present invention, torque interruptions is prevented when shifting gears, thereby providing an excellent shift quality and improving fuel efficiency of a vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid power train for a vehicle comprising:
    a gear module having a plurality of shift stages of a synchromesh type on a first input shaft and an output shaft arranged in parallel;
    a second input shaft driven by a motor and disposed coaxially with the first input shaft;
    a clutch means for connecting or disconnecting the second input shaft and the first input shaft; and
    variable shift ratio providing means for transmitting the torque of the second input shaft to the output shaft through an external engaged-gear pair selectively in two different shift ratios.

2. The hybrid power train of claim 1, wherein the variable shift ratio providing means is configured to establish a series of shift ratios having effective intervals together with the shift stages implemented by the gear module.

3. The hybrid power train of claim 2, wherein:
    the gear module is provided with the shift stages having shift ratios of at least forward first and fourth stages; and
    the variable shift ratio providing means establishes shift ratios of second and third stages.

4. The hybrid power train of claim 1, wherein the clutch means comprises a synchronizer having a hub installed on the second input shaft.

5. The hybrid power train of claim 1, wherein the variable shift ratio providing means comprises a planetary gear unit, of which a first one of three rotary elements is directly connected to the second input shaft, a second one is directly connected to an external engaged gear of the external engaged-gear pair, and a third one is directly connected to a brake capable of restricting the rotation thereof.

6. The hybrid power train of claim 5, wherein the external engaged-gear to which the planetary gear unit is connected is installed coaxially on the second input shaft and a one-way clutch for delivering power in only one direction from the second input shaft to the external engaged-gear is provided between the external engaged-gear and the second input shaft.

7. The hybrid power train of claim 6, wherein the planetary gear unit comprises the three rotary elements consisting of a sun gear, a carrier, and a ring gear, and wherein the carrier is directly connected to the second input shaft, the ring gear is directly connected to the external engaged-gear, and the sun gear is connected to the brake.

\* \* \* \* \*